Patented Sept. 19, 1944

2,358,465

UNITED STATES PATENT OFFICE 2,358,465

SULPHONAMIDE COMPOUNDS

James G. McNally and Joseph B. Dickey, Rochester, N. Y., assignors to Eastman Kodak Company, Rochester, N. Y., a corporation of New Jersey No Drawing. Application July 11, 1941,
Serial No. 401,972

13 Claims. (Cl. 260—556)

This invention relates to sulphonamide compounds, and more particularly to dinitroaminobenzene sulphonamide compounds.

This application is a continuation-in-part of our copending application Serial No. 282,526, filed July 1, 1939, now U. S. Patent 2,261,175, dated November 4, 1941.

As pointed out in the aforesaid application, such aminobenzene compounds have various industrial uses, as for example, such compounds constitute an important element in the manufacture of certain types of dyes. The compounds also have various other uses. In the prior art there are found compounds which might appear to resemble our novel compounds in some respects. However, such prior art compounds, rather than being the sulphonamide type are the sulphone type and are not as satisfactory as the compounds of the present invention. While certain compounds containing the sulphonamide grouping in the molecule have been described in the prior art, such compounds have not been utilizable in dye manufacture for various reasons such as the absence of a diazotizable amino group. It is, therefore, apparent that the development of aminoarylsulphonamide derivatives which overcome the disadvantages of the prior art and which are capable of use in the manufacture of azo dyes, as well as other industrial uses, is a highly desirable result.

This invention has for one object to provide new and improved arylsulphonamide compounds and method of manufacture. Another object is to provide new sulphonamide compounds particularly useful in azo dye manufacture. A still further object is to provide new compounds having not only a sulphonamide group or substituted group therein, but also containing in the molecule a diazotizable amino group. A still further object is to provide novel intermediate compounds from which may be readily obtained the aforesaid compounds and new and improved methods of manufacturing the aforesaid compounds. Other objects will appear hereinafter.

While we describe our invention generically and refer to certain general methods by which our novel compounds may be produced, as will be set forth in detail hereinafter, there are certain of our novel sulphonamide derivatives which give especially outstanding results and our invention relates in particular thereto. That is, particular reference is made to the 3,5-dinitroaminobenzenesulphonamide compounds wherein one or more of the hydrogen atoms of the amide group may be substituted with certain substituents such as alkoxy alkyl or other alkyl groupings.

Referring now to certain of the more general aspects of our invention, our arylamines may be broadly formulated as follows:

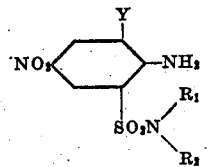

wherein $R_1$ and $R_2$, for example, represent members selected from the group consisting of hydrogen, alkyl groups such as methyl, ethyl, propyl, butyl and the like, hydroxyl groups such as hydroxyethyl, dihydroxylpropyl, alkoxyalkyl groups such as methoxyethyl, ethoxyethyl and the like, alkylene groups, cycloalkyl groups, aryl groups or hydro-derivatives of aryl groups, and Y preferably represents a nitro group, but may in certain instances represent a member selected from the group consisting of halogen, alkyl group, alkoxy group, or a sulphonamide group. The amino compounds, in accordance with this invention, may be prepared by halogenating, nitrating, or sulphonating with chlorosulphonic acid the necessary aryl compound and reacting with ammonia or various amines, as desired. However, details of preferred operation will be set forth hereinafter.

In particular, however, we prefer to produce compounds having a general formula:

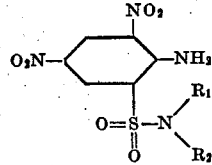

wherein $R_1$ and $R_2$ have the meaning already indicated.

For a ready and convenient understanding of the products used in and the process steps applied for manufacturing our new compounds, set forth below in the form of equations are formulations of the steps respecting the manufacture of certain compounds in accordance with the present invention:

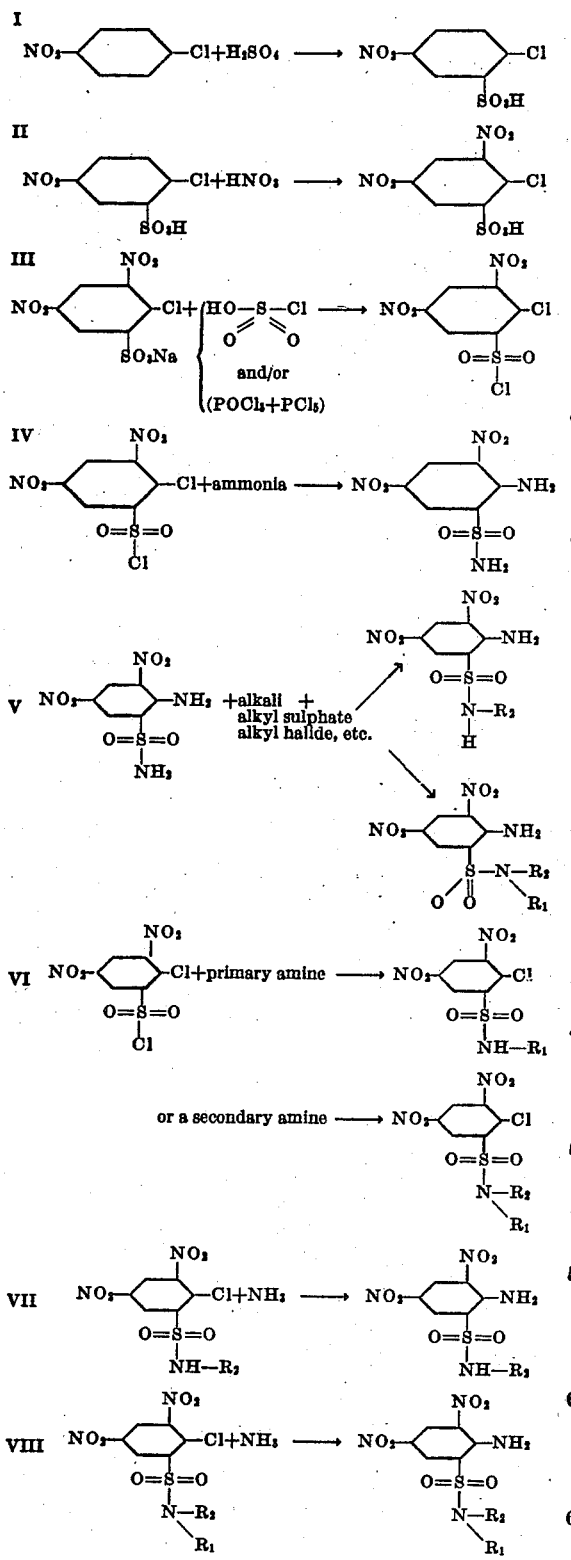

(*Note*.—In the foregoing, for brevity $R_1$ and $R_2$ refer to the alkyl or other comparable group.)

While the preparation of certain of the starting materials employed is apparent from prior art disclosures, in view of the fact that a halogenated derivative under Steps III and VI is particularly important as an intermediate material, I will describe in detail the preparation of such halogen derivatives, particularly with respect to the 2-amino-3,5-dinitro compound. In the event it is desired to produce the 2,6-dinitro derivative this may likewise be accomplished in a comparable manner, as well as other modifications carried out, as will be described hereinafter.

Referring now to the preparation of a halogen derivative which will be employed in one of the intermediate steps of preparing certain of my preferred 2-amino-3,5-dinitro preferred compounds, such halogen compounds could advantageously be prepared as follows:

EXAMPLE 1.—*Preparation of 2-chloro-3,5-dinitrobenzene-sulphonyl chloride*

25 gm. 2-chloro-3,5-dinitrobenzene sulphonic acid sodium salt are heated to 150° for 16 hours with 30 cc. chloro sulphonic acid. The product is poured onto ice and then warmed to 50° to dissolve the unchanged sodium 2-chloro-3,5-dinitrobenzene sulphonic acid. The acid chloride is filtered off, washed and dried. The yield of product melting at 101–103° is 80%.

After having obtained a satisfactory intermediate starting material such material or analogous halogenated derivative may be further used in accordance with the above described equations for making the final compounds in accordance with the present invention, details respecting such further reaction being set forth as follows:

EXAMPLE 2.—*Preparation of 2-amino-3,5-dinitrobenzenesulphonamide*

One mole of finely divided 2-chlor-3,5-dinitrobenzenesulphonyl chloride is added slowly to 10 moles iced ammonia water with vigorous stirring. The reaction mixture is allowed to warm slowly to room temperature and is then warmed until all of the product passes into solution. Upon cooling, a yellow crystalline mass separates which is filtered, washed with water and dried. A good yield of 2-amino-3,5-dinitrobenzenesulphonamide is obtained which melts at 255° C.

EXAMPLE 3.—*Preparation of N-ethyl-3,5-dinitro-2-chlorobenzene-1-sulphonamide*

602 gm. of 3,5-dinitro-2-chlorobenzene-1-sulphonyl chloride are dissolved in 5 l. of acetone and the solution cooled to −10° C. With vigorous stirring, 592 cc. ethylamine (33% in water, 4 moles) are added slowly over 2½ hours, keeping the temperature of reaction at −5° C. to −10° C. The mixture is then stirred for 2–3 hours allowing the temperature to rise to 0° C. The mixture is then diluted with 15 l. water and the precipitate filtered off. 565 gm. of N-ethyl-3,5-dinitro-2-chlorobenzene-1-sulphamide are obtained, melting at 138–141° C. Analysis: Chlorine, calculated for $C_8H_8N_3SO_6Cl$—11.50%; found 11.82%.

Similarly there may be prepared the following:

| | Melting point |
|---|---|
| N-methyl-3,5-dinitro-2-chlorobenzene-1-sulphonamide | 146– 9° |
| N-hydroxyethyl-3,5-dinitro-2-chlorobenzene-1-sulphonamide | 149–51° |
| N-methoxyethyl-3,5-dinitro-2-chlorobenzene-1-sulphonamide | 86– 8° |

EXAMPLE 4.—*Preparation of N-hydroxyethyl-3,5-dinitro-2-aminobenzene-1-sulphonamide*

53 gm. of N-hydroxyethyl-3,5-dinitro-2-chlorobenzene-1-sulphonamide and 250 cc. concentrated ammonia (28%) are stirred at room temperature (25° C. approx.) for 3–4 hours until the solid no longer gives a test for halogen. The mixture is then heated cautiously on the steam bath to 90°, diluted to 1 liter with water, cooled and filtered. 41 gm. of N-hydroxyethyl-3,5-dinitro-2-aminobenzene-1-sulphonamide are obtained, melting at 175–6°.

In a similar manner are prepared:

|  | Melting point |
|---|---|
| N-methyl-3,5-dinitro-2-aminobenzene-1-sulphonamide | 173– 5° |
| N-ethyl-3,5-dinitro-2-aminobenzene-1-sulphonamide | 148–50° |
| N-methoxyethyl-3,5-dinitro-2-aminobenzene-1-sulphonamide | 154– 6° |

While I have described in particular the use of halogen derivatives, it is to be understood that my novel compounds are not restricted to ones derived solely from this source. For example, in the preparation of my compounds it is also possible to use alkali salts of certain starting materials or the combination methods employing both alkali salts and halogen derivatives. Still further examples of producing compounds in accordance with my invention are as follows:

EXAMPLE 5.—*Preparation of 2-amino-3,5-dinitrobenzenediethylsulphonamide*

One mole of the disodium salt of 2-amino-3,5-dinitrobenzenesulphonamide is heated with 2.25 moles ethyl sulphate at reflux for 1 hour using methyl Carbitol or Cellosolve as a solvent. Most of the solvent is distilled off under reduced pressure and water is added. The mixture is made alkaline with sodium hydroxide and filtered. The product is crystallized if desired. There is obtained an excellent yield of the amide melting at 136–138°. In a similar manner there have been prepared 2-amino-3,5-dinitrobenzenedimethylsulphonamide; 2-amino-3,5-dinitrobenzenedipropylsulphonamide; 2-amino-3,5-dinitrobenzensulphondibutylamide; 2-amino-3,5-dinitro-di-β-hydroxyethylamide, etc.

EXAMPLE 6.—*Preparation of 2-amino-3,5-dinitroethylbenzenesulphonamide*

15 gm. 2-amino-3,5-dinitrobenzenesulphonamide mono-sodium salt dissolved in Carbitol are heated to refluxing with 10 gm. ethyl sulphate. After 1 hour the reaction mixture is poured into water and made alkaline with sodium hydroxide. The insoluble diethylamide is removed by filtration and the filtrate is made acid with hydrochloric acid. The monoethylamide is recovered by filtration and melts at 149–150°. Ethyl iodide may be used in place of ethyl-sulphate. In a similar manner the mono-methyl-, propyl, butyl, cyclohexyl, benzyl, etc. compounds have been prepared.

The foregoing examples represent procedure by which my preferred dinitro compounds are produced. The aforesaid 2-amino-3,5-dinitro compounds, as described, are particularly valuable compounds for various uses in dye manufacture, enabling the production of shades of dyes not obtainable by other sulphonamide or sulphone compounds. There are, however, certain isomers of the compounds described which, while not giving the same results or being capable of all the uses of our preferred compounds, are valuable compounds, and may be produced and used in a manner somewhat comparable to that already described. For example, these compounds may be generically formulated as follows:

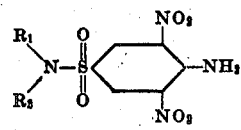

wherein $R_1$ and $R_2$ have the meaning already assigned.

For convenience of consideration and conciseness of disclosure below we set forth in the form of equations, steps in the preparation of said compounds in a manner paralleling the preceding description:

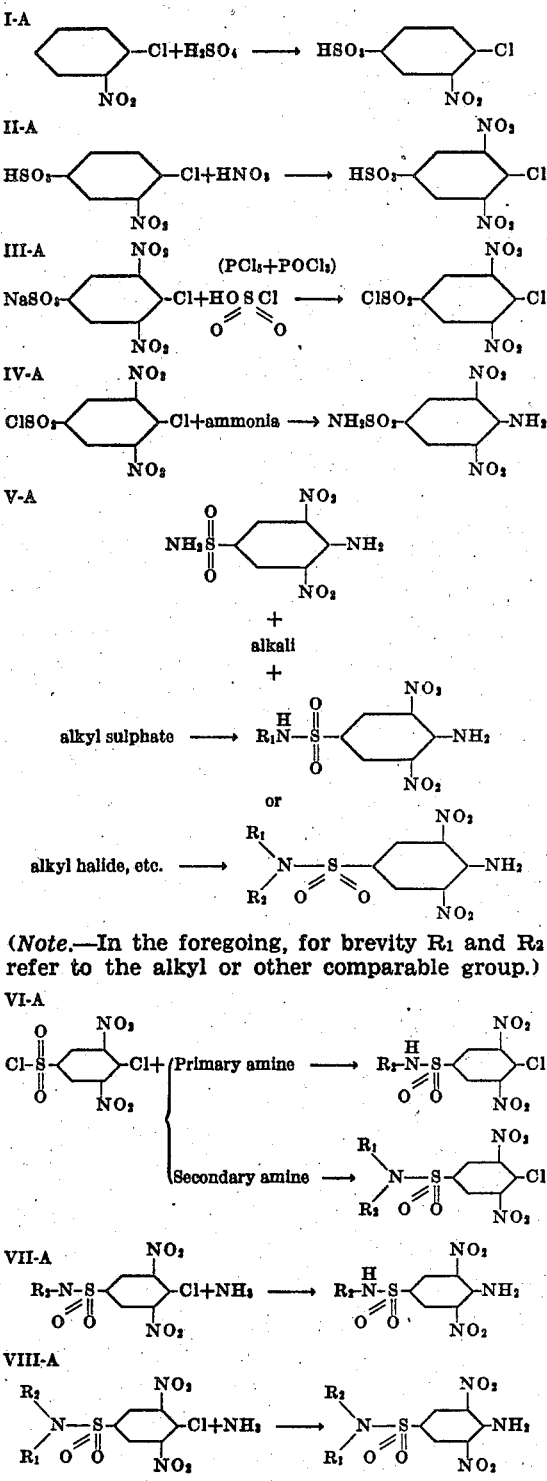

(*Note*.—In the foregoing, for brevity $R_1$ and $R_2$ refer to the alkyl or other comparable group.)

Likewise in the preparation of these di-nitro sulphonamide compounds wherein the sulphonamide group is in a position para to the amino group, the compounds may be made from the halogen derivative, as for example, the chlorine derivative or alkali salts may be employed. The halogen derivative could be produced in a manner similar to the preparation set forth in Example 1.

EXAMPLE 7.—*Preparation of 4-chloro-3,5-dinitrobenzene-sulphonyl chloride*

25 g. of sodium-4-chloro-3,5-dinitrobenzenesulphonic acid are heated to 150° for 16 hours with 30 cc. of chlorosulphonic acid and then poured onto ice. The mixture is warmed to 50° to dissolve the unchanged sulphonic acid. The acid chloride is filtered off, washed with water, and dried.

Having the halogen derivative it could be reacted with ammonia to produce the amide in a manner analogous to Examples 2, 3, and 4. That is, having 4-chloro-3,5-benzenesulphonyl chloride this compound could be reacted with iced ammonia water with vigorous agitation to obtain 4-amino-3,5-dinitrobenzenesulphonamide.

Or the aforesaid halogen compound (3,5-dinitro-4-chlorobenzene-1-sulphonyl chloride) in solution of a ketone such as acetone cooled to below 0° C. could be reacted with an alkylamine such as ethylamine to obtain the N-alkyl 3,5-dinitro-4-chlorobenzene-1-sulphonamide.

The compounds such as N-hydroxyethyl-3,5-dinitro-4-aminobenzene-1-sulphonamide, N-methyl-3,5-dinitro-4-aminobenzene-1-sulphonamide, N-ethyl-3,5-dinitro-4-aminobenzene-1-sulphonamide, and N-methoxyethyl-3,5-dinitro-4-aminobenzene-1-sulphonamide could be produced in a manner analogous to the process used in Example 4.

Likewise the sodium salt may be employed in a manner somewhat comparable to the procedure already described, as may be apparent from a consideration of the following examples:

EXAMPLE 8.—*Preparation of 4-amino-3,5-dinitrobenzenediethylsulphonamide*

One mole of the disodium salt of 4-amino-3,5-dinitrobenzenesulphonamide is heated with 2.25 moles of ethyl sulphate at reflux for 1 hour using methyl Carbitol or Cellosolve as a solvent. Most of the solvent is distilled off under reduced pressure and water is added. The mixture is made alkaline with sodium hydroxide and filtered. The product is crystallized is desired. There is obtained an excellent yield of the amide. In a similar manner there have been prepared 4-amino-3,5-dinitrobenzenedimethylsulphonamide; 2-amino-3,5-dinitrobenzenedipropylsulphonamide; 2-amino-3,5-dinitrobenzenesulphondibutylamide; 2-amino-3,5-dinitro-di-β-hydroxyethylsulphonamide, etc.

EXAMPLE 9.—*Preparation of 4-amino-3,5-dinitroethylbenzenesulphonamide*

15 g. of 4-amino-3,5-dinitrobenzenesulphonamide monosodium salt dissolved in Carbitol are heated to refluxing with 10 g. of ethyl sulphate. After 1 hour the reaction mixture is poured into water and made alkaline with sodium hydroxide. The insoluble diethylamide is removed by filtration and the filtrate is made acid with hydrochloric acid. The monoethylamide is recovered by filtration. Ethyl iodide may be used in place of ethyl sulphate. In a similar manner the mono-methyl-, propyl, butyl, cyclohexyl, benzyl, etc., compounds have been prepared.

In further detail certain of the specific compounds and their melting points, which may be prepared by procedure apparent from the foregoing disclosure, are as follows:

3,5-dinitro-2-chlorobenzenesulphonbenzylamide, M. P. 240–241° C.
3,5-dinitro-2-aminobenzenesulphonbenzylamide, M. P. 217–218° C.
3,5-dinitro-2-aminobenzenesulphon-α-pyridylamide, M. P. 235–238° C.
3,5-dinitro-2-aminobenzenesulphoncyclohexylamide, M. P. 214–215° C.
3,5-dinitro-2-chlorobenzenesulphoncetylamide, M. P. 98–100° C.
3,5-dinitro-2-aminobenzenesulphoncetylamide, M. P. 142–150° C.
3,5-dinitro-2-chlorobenzenesulphon-β-hydroxy-β-ethoxyethylamide, M. P. 216–217° C.
3,5-dinitro-2-aminobenzenesulphon-β-hydroxy-β-ethoxyethylamide, M. P. 181–183° C.
3,5-dintiro-2-chlorobenzenesulphonanilide, M. P. 177–179° C.
3,5-dinitro-2-aminobenzenesulphonanilide, M. P. 163–164° C.
3,5-dinitro-2-chlorobenzenesulphon-p-dimethylaminoanilide, M. P. 186–189° C.
3,5-dinitro-2-aminobenzenesulphon-p-dimethylaminoanilide, M. P. 175–178° C.
3,5-dinitro-2-chlorobenzenesulphontetrahydrofurfurylamide, M. P. 140–142° C.
3,5-dinitro-2-aminobenzenesulphontetrahydrofurfurylamide, M. P. 100–101° C.

In the foregoing examples specifically in place of the chlorine derivative we may employ the bromide or iodine derivative.

The compounds of our invention have a plurality of nitro groups attached to the benzene nucleus as well as diazotizable amino groups and the aforedescribed sulphonamide substituted amides are particularly valuable compounds. These compounds are superior to what might appear to be similar sulphone compounds in that, for example, our compounds are less acid, have better solubility, and other properties superior to prior art compounds.

It is, therefore, apparent from the foregoing that certain of the generic aspects of our invention are susceptible of some modification, hence, we do not wish to be restricted excepting insofar as is necessitated by the prior art and the spirit of the appended claims.

What we claim and desire to be secured by Letters Patent of the United States is:

1. The compound having the formula:

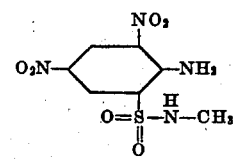

2. The compound having the formula:

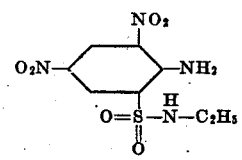

3. The compound having the formula:

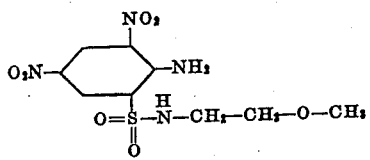

4. The compound having the formula:

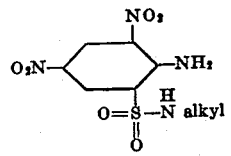

5. A process for preparing a sulphonamido compound comprising condensing 2-chloro-3,5-dinitro-1-sulphonyl chloride with a primary monoamine selected from the group consisting of alkylamines, hydroxyalkylamines, alkoxyalkylamines, cyclohexylamine, aralkylamines of the benzene series and arylamines of the benzene series, at a temperature below 0° C.

6. A process for preparing a sulphonamido compound comprising condensing 2-chloro-3,5-dinitro-1-sulphonyl chloride with a primary monoamine selected from the group consisting of alkylamines, hydroxyalkylamines, alkoxyalkylamines, cyclohexylamine, aralkylamines of the benzene series and arylamines of the benzene series, at a temperature below 0° C., and then condensing the resulting sulphonamido compound with ammonia.

7. A process for preparing a sulphonamido compound comprising condensing 2-chloro-3,5-dinitro-1-sulphonyl chloride with ethylamine at a temperature below 0° C.

8. A process for preparing a sulphonamido compound comprising condensing 2-chloro-3,5-dinitro-1-sulphonyl chloride with ethylamine, at a temperature below 0° C., and then condensing the resulting 2-chloro-3,5-dinitro-1-sulphonamido compound with ammonia.

9. A process for preparing a sulphonamido compound comprising condensing 2-chloro-3,5-dinitro-1-sulphonyl chloride with methylamine at a temperature below 0° C.

10. A process for preparing a sulphonamido compound comprising condensing 2-chloro-3,5-dinitro-1-sulphonyl chloride with methylamine, at a temperature below 0° C., and then condensing the resulting 2-chloro-3,5-dinitro-1-sulphonamido compound with ammonia.

11. A process for preparing a sulphonamido compound comprising condensing 2-chloro-3,5-dinitro-1-sulphonyl chloride with $\beta$-methoxy ethylamine, at a temperature below 0° C.

12. A process for preparing a sulphonamido compound comprising condensing 2-chloro-3,5-dinitro-1-sulphonyl chloride with $\beta$-methoxy ethylamine, at a temperature below 0° C., and then condensing the resulting 2-chloro-3,5-dinitro-1-sulphonamido compound with ammonia.

13. A compound having the general formula:

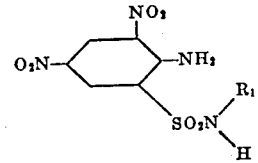

wherein $R_1$ represents a member selected from the group consisting of hydrogen, an alkyl group, a hydroxyalkyl group, an alkoxyalkyl group, a cyclohexyl group, an aralkyl group of the benzene series and an aryl group of the benzene series.

JAMES G. McNALLY.
JOSEPH B. DICKEY.

Certificate of Correction

Patent No. 2,358,465. September 19, 1944.

JAMES G. McNALLY ET AL.

It is hereby certified that error appears in the printed specification of the above-numbered patent requiring correction as follows: Page 2, first column, lines 39–40, for that portion of Formula V reading  and that the said Letters Patent should be read with this correction therein that the same may conform to the record of the case in the Patent Office.

Signed and sealed this 28th day of November, A. D. 1944.

[SEAL]

LESLIE FRAZER,
*Acting Commissioner of Patents.*